Dec. 1, 1959  R. I. HOMIER  2,915,111
ADJUSTABLE SEAT BACK
Filed Aug. 26, 1957  3 Sheets-Sheet 2
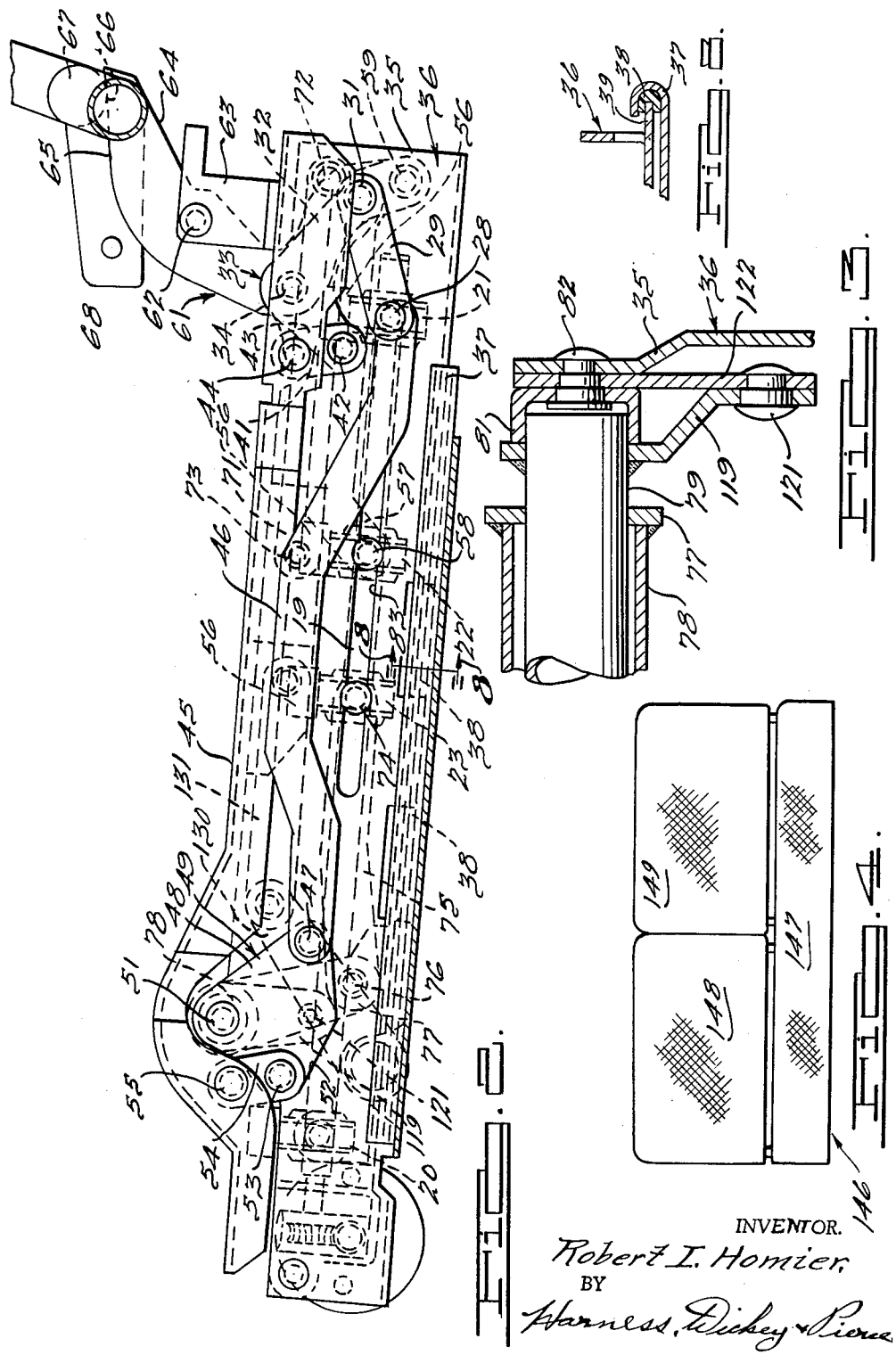
INVENTOR.
Robert I. Homier,
BY
Harness, Dickey & Pierce
ATTORNEYS.

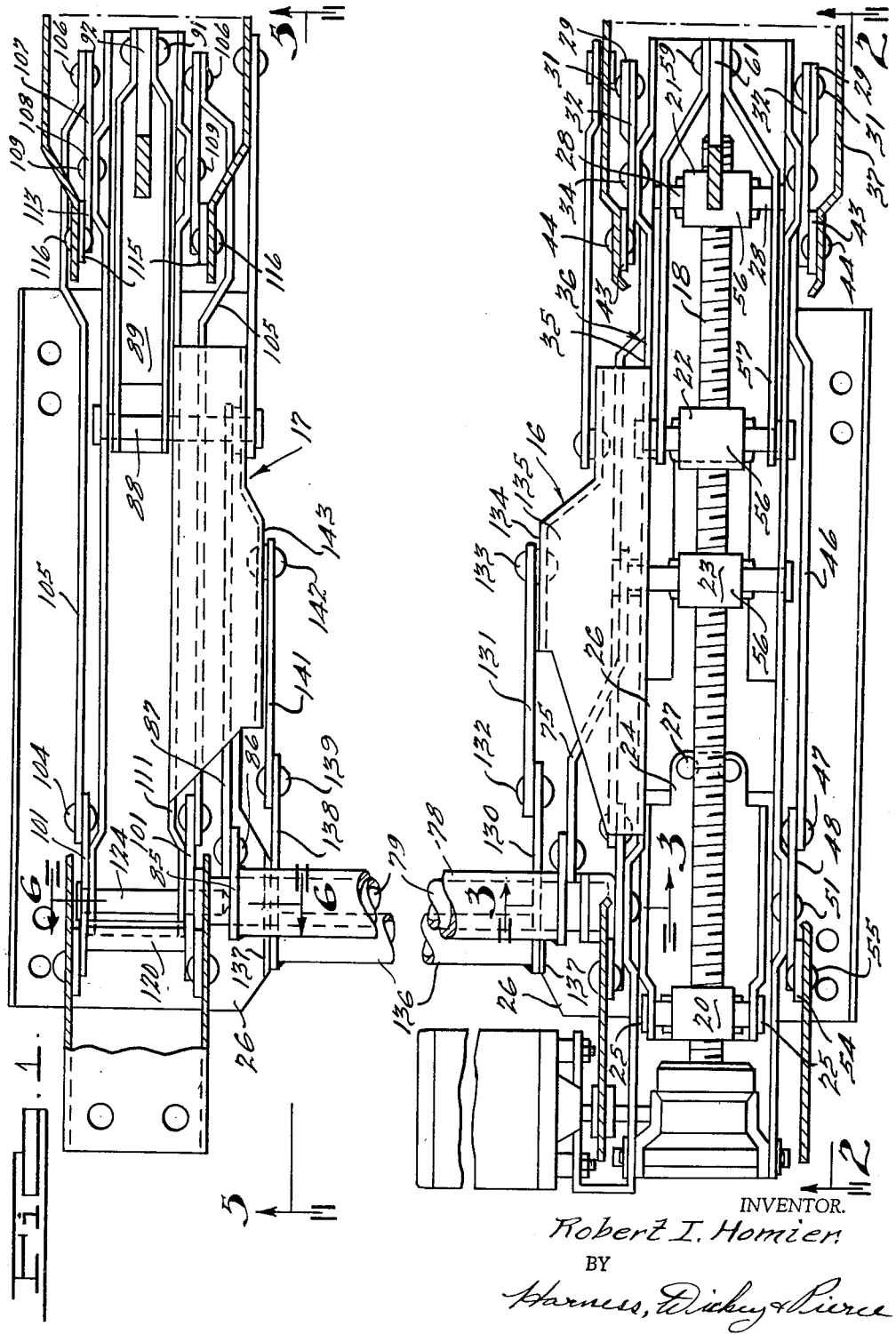

Dec. 1, 1959  R. I. HOMIER  2,915,111
ADJUSTABLE SEAT BACK
Filed Aug. 26, 1957  3 Sheets-Sheet 3
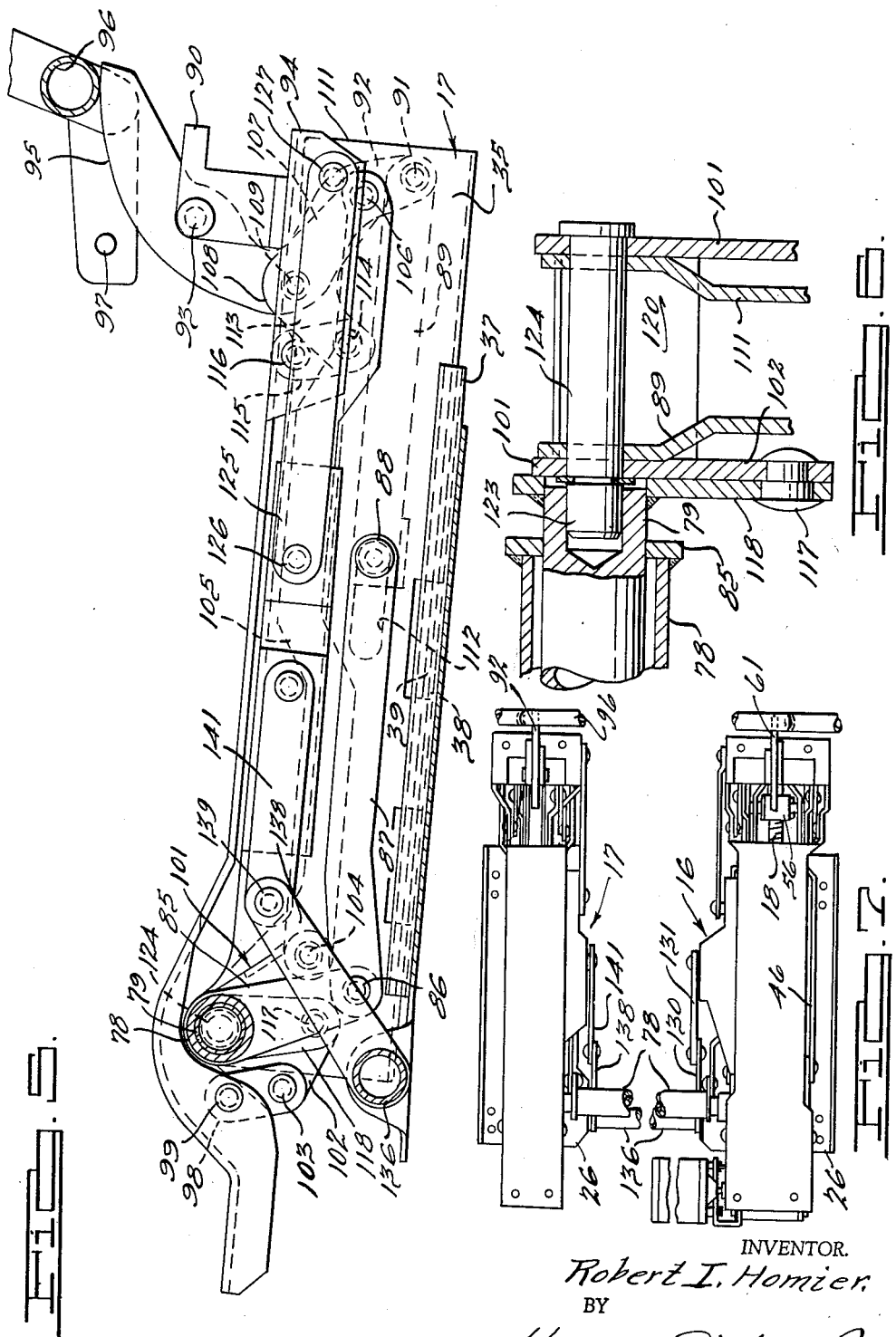
INVENTOR.
Robert I. Homier
BY
Harness, Dickey & Pierce
ATTORNEYS.

United States Patent Office 2,915,111
Patented Dec. 1, 1959

2,915,111

ADJUSTABLE SEAT BACK

Robert I. Homier, Detroit, Mich., assignor to American Metal Products Company, Detroit, Mich., a corporation of Michigan Application August 26, 1957, Serial No. 680,300

14 Claims. (Cl. 155—14)

This invention relates to seat mechanisms and particularly to a seat mechanism containing power means for adjusting the seat vertically and horizontally and for tilting a back to different positions.

In the copending application of R. I. Homier, Serial No. 676,750, filed August 7, 1957, for Seat Supporting Mechanism and assigned to the assignee of the present invention, a seat supporting device is illustrated comprising two spaced mechanisms having similar supporting and actuating elements which are driven by a device carried by one of the mechanisms to cause the seat supporting elements of both mechanisms to be shifted hozizontally and vertically in synchronized relation to each other. The driving device embodied a lead screw having three solenoid controlled nuts thereon, one of which shifted the seat forwardly and rearwardly, another of which raised and lowered the front end of the seat, while the third raised and lowered the back end of the seat. The nuts could be controlled independently or simultaneously to thereby permit the seat to be tilted.

The structure of the present invention employs a solenoid actuated nut mechanism on a lead screw for shifting the seat forwardly and rearwardly. A second solenoid actuated nut mechanism on the lead screw is employed for simultaneously raising and lowering both ends of the seat. A third solenoid actuated nut mechanism on the lead screw is employed for tilting the driver's section of the seat back to different positions. A fourth solenoid actuated nut mechanism on the lead screw is employed for tilting the passenger section of the back seat to a desired position. The construction is so arranged that a control button permits the passenger to tilt the passenger seat back section to a desired position, while the driver has control buttons for each seat back section permitting the driver to tilt the two seat back sections independently to desired positions.

Accordingly, the main objects of the invention are: to provide a mechanism for supporting a seat and adjusting it horizontally and vertically and tilting the seat back thereof to a desired position; to provide a mechanism for tilting the driver and passenger seat back section independently the same or different amounts; to provide controls for tilting the two back sections of a seat, one of which is actuated by the passenger for tilting the passenger section the others of which are actuated by the driver to tilt either section simultaneously or independently, and in general to provide a mechanism for controlling the horizontal and vertical positions of a seat and tilt the sections of its back which is simple in construction, positive in operation and economical to manufacture.

Other objects and features of novelty of the invention will be specifically pointed out or become apparent when referring, for a better understanding of the invention, to the following description taken in conjunction with the accompanying drawings wherein:

Figure 1 is a broken plan view of a seat mechanism with parts in section embodying features of the present invention;

Fig. 2 is a view in side elevation of the structure illustrated in Fig. 1, as viewed from line 2—2 thereof;

Fig. 3 is an enlarged broken sectional view of the structure illustrated in Fig. 1, taken on the line 3—3 thereof;

Fig. 4 is a view in elevation of a seat with separate seat back sections for the driver and passenger;

Fig. 5 is a view in side elevation of the structure illustrated in Fig. 1 as viewed from line 5—5 thereof;

Fig. 6 is an enlarged sectional view of the structure illustrated in Fig. 1 taken on the line 6—6 thereof;

Fig. 7 is a reduced plan view of the structure illustrated in Fig. 1; and

Fig. 8 is a broken sectional view of the structure illustrated in Fig. 2 taken on the line 8—8 thereof.

It will be noted in Fig. 1 that the mechanism 16 at the left-hand side of the seat, as viewed from an occupied position, is similar to the operating mechanism of the above mentioned copending application. The seat supporting mechanism 17 on the right-hand side of the seat is similar to that of the right-hand side of the seat supporting mechanism of the above mentioned copending application. The primary difference between the two mechanisms 16 and 17 is in the operating lead screw 18 which has four solenoid operated nut mechanisms thereon while that of the above mentioned copending application had three nut mechanisms thereon. On the device of the copending application, one nut mechanism is employed for moving the seat forwardly and rearwardly, another for raising and lowering the front end of the seat and the third for raising and lowering the rear end of the seat.

Of the four nut mechanisms employed on the lead screw 18 of the seat supporting mechanism of the present invention, the nut mechanism 20 is employed for moving the seat forwardly and rearwardly. The nut assembly 21 is employed for raising and lowering the seat at the forward and rearward ends simultaneously. The nut mechanism 22 is employed for tilting the driver's seat back section to any desired position and to retain the back section in the adjusted position irrespective of the adjusted height of the seat. The nut assembly 23 controls the tilting of the passenger seat back section and the securing of the back section in tilted position at any point in the vertically adjusted position of the seat.

In so far as the horizontal movement of the seat is concerned, such movement is effected in substantially the same manner as that illustrated and described in the aforementioned application. The nut assembly 20 is directly connected to a channel-shaped bracket 24 through shouldered screws 25 to a base supporting element 26 by a pair of rivets 27. The shouldered screws 28 of the nut assembly 21 are connected to one end of links 29, the other ends of which are secured by rivets 31 to arms 32 of a pair of bell cranks 33. The pair of bell cranks is secured by a rivet 34 to side walls 35 of a slide 36 which is shifted backwardly and forwardly upon an encompassing channel element 37 on low friction shoes 38. The shoes are secured in struck-out flanged portions 39 from the walls 35 of the slide 36 as illustrated in Fig. 8. The additional arms 41 of the bell cranks 33 are secured by pivots 42 to free floating links 43 which are attached by rivets 44 to the flanges of the seat supporting element 45.

A link 46 is secured to the shouldered screws 28 of the nut mechanism 21, the opposite end being secured by a rivet 47 to an arm portion 48 of a bell crank plate 49. The bell crank plate 49 is secured by a pivot 51 to the upstanding wall 35 of the slide 36. The additional arm portion 52 of the bell crank plate 49 has its end secured by a rivet 53 to a free floating link 54, the upper end of which is secured by a rivet 55 to the side flanges of the seat supporting element 45. When the nut assembly 21 has its solenoid 56 energized, the nut is held to its encompassing casing and is driven along the lead screw, to thereby rock the forward crank on plate 49 and the rearward bell cranks 33 simultaneously, to thereby raise or lower the forward and rear edges of the seat supporting element 45.

When the nut assembly 22 has its solenoid energized to secure the nut against rotation on the lead screw 18, a link 57 is moved forwardly or rearwardly by having the forward end secured to the nut by the shouldered screws 58. It will be noted that the shouldered pins 74, 58 and 30 of the nut assemblies 21, 22 and 23 all operate in a slot 83 in the side walls 35 of the slide 36. This reduces the bending movement on the lead screw and permits a lead screw of smaller diameter to be employed. The opposite end of the link 57 is connected by a rivet 59 to the lower end of a substantially S-shaped lever 61 which is secured by a pivot 62 to the rear edge 63 of the seat frame. The portion 63 may be a projecting bracket secured to the seat supporting element 45 permitting the seat frame to be a separate unit. Above the pivot 62, the arm portion 64 of the link 61 has a surface 65 which engages the seat back at some point, hereby illustrated as by an offset portion 66 of a transverse tubular frame section 67. By rocking the link 61, the surface 65 is adjusted relative to the offset portion 66 to regulate the angular position of the back as it tilts about its pivot 68 normally provided therefor on the seat supporting structure. Thus, through the movement of the nut mechanism 22 backwardly and forwardly on the lead screw 18, the rocking of the link 61 about the pivot 62 controls the position of the driver's back seat section.

It will be noted that this movement is entirely independent of the raising movement of the seat so that when the seat cushion is raised or lowered the back does not change its position. This arrangement is accomplished primarily by the use of a link 71 having the rear end thereof secured by a pivot 72 to the seat supporting member 45 and the forward end thereof secured by a pivot 73 to the horizontally movable slide 36. The seat supporting element 45, in view of the floating links 43 and 54, is unstable and is free to move backwardly and forwardly, which movement is stabilized by the use of the link 71. This link is in parallelogram relation to the link 57 and causes the seat supporting element 45 to move along a path which is parallel to the movement of the pivot 59, to thereby maintain the seat back in the position of adjustment so that it is not tilted each time he elevation of the seat cushion is changed. This same parallel path relationship is obtained by guiding the rivet 72 in a cam slot or along a cam surface which produces the same movement thereto as the parallelogram relationship above mentioned.

The nut assembly 23 is secured by shouldered setscrews 74 to a link 75, the forward end being connected by a rivet 76 to an arm 77. The arm 77 is welded to one end of the torsion bar 78, and pivoted upon a torsion bar 79 which has its end press-fitted into cap 81 that is pivoted on a rivet 82 on the wall 35 of the slide 36 as illustrated in Fig. 3. As illustrated in Figs. 5 and 6 the opposite end of the torsion bar 78 has an arm 85, which is essentially the same as the arm 77, joined by a rivet 86 to a channel-shaped link 87 which has a pin 88 extending through its rear end. The pin extends through a channel-shaped member 89, the rear end of which is secured by a rivet 91 to a link 92 which is similar to the link 61 on the supporting elements 15 and 16. This link is secured by a pivot 93 to the seat frame or to a bracket 90 on a vertically adjustable seat supporting element 94 to have the surface 95 of the link 92 engage the offset portion of the laterally disposed frame element 96 thereof, to thereby retain the back in tilted position about its pivot 97. The seat supporting element 94 is attached to a forward pair of links 98 by rivets 99, the links 98 being joined to a pair of bell crank plates 101 at arm portions 102 thereof by rivets 103. The opposite arm portions of the bell crank plate are connected by rivets 104 to offset links 105, the opposite ends of which are secured by rivets 106 to the arms 107 of a pair of bell cranks 108. The bell cranks are pivotally secured on rivets 109 supported on the side walls of a slide 111 through a slot 112 of which the pin 88 extends. The other arms 113 of the bell cranks 108 are secured by rivets 114 to free floating links 115 by the rivet 116 at the rear portion of the assembly. The central portions of the bell crank plates 101 adjacent to the torsion bar 79 support a rivet 117 which secures an arm 118 to the plate for swinging movement along therewith. The arm 118 is welded to the adjacent end of the torsion bar 79, the opposite end of which is connected to an arm 119 which is secured by a pin 121 to the web portion 122 of the bell crank plate 49 as illustrated in Figs. 2 and 6. The end of the torsion bar 79 of the mechanism 17 receives the end 123 of a pin 124 which extends through the bell crank plates 101 which are joined together by a web 120. The pin 124 extends through apertures in the walls of the slide 111. When the nut assembly 21 is energized to produce the raising and lowering of the seat supporting element 45 of the mechanism 16, this motion is transferred through the arm 119, torsion bar 79, to the arm 118, to thereby rotate the bell crank plates 101 of the mechanism 18 to produce the raising and lowering movement of the seat supporting element 94 in synchronism with the element 45 of the mechanism 16.

The links 98 and 115 permit the seat supporting element 94 to swing backwardly and forwardly and is thereby unstable. Such movement is controlled by a link 125 which is secured by a rivet 126 to the slide 111 and by a pivot 127 to the seat supporting element 94. The pivots 126 and 127 are in parallelogram relationship to the pivots 88 and 91 for controlling the arcuate movement of the two pivots 127 and 91 in the same manner as referred to hereinabove for maintaining the surface 95 of the link 92 in adjusted position irrespective of the vertical adjustment of the seat cushion. This same control may be obtained by the movement of the pivot 127 in a cam slot or along a cam surface in the manner above described.

The seat supporting device is moved back and forth on the channel elements 37 of the mechanisms 16 and 18 by having the slide 36 move the slide 111 along therewith. The synchronized movement of the slide 111 by the slide 36 is produced by the operation of an arm 130 from a link 131 which is secured thereto by a rivet 132 as illustrated in Fig. 1. The opposite end of the link 131 is secured by a rivet 133 to a downwardly extending flange 134 on an expanding portion 135 of the side flange 35 of the slide 36. The arm 130 is secured to a torsion bar 136, the ends of which are pivoted to flanges 137 of the base supporting elements 26 of both mechanisms. The end of the torsion bar 136 adjacent to the mechanism 17 has an arm 138 welded thereto, the end of which is secured by a rivet 139 to a link 141 which is secured by a pivot 142 to the flange 143 of an extension 144 on the slide 111. When the slide 36 of the mechanism 16 is moved backwardly or forwardly by the lead screw 18 advancing through the nut mechanism 20, the rotation of the torsion bar 136 will produce the same movement to the slide 111 of the mechanism 17.

By employing four nuts on the lead screw, and by having the shouldered screws on the nut mechanisms 21, 22 and 23 operate in the slot 83 of the slide 36, the bending strain on the lead screw is substantially minimized, permitting a minimum diameter screw to be employed which is only required to withstand tensile, compression and torsion strains. The use of the four nuts permits the horizontal and vertical adjustment of the seat and the adjustment of the two back sections simultaneously or independently. A control is provided for the passenger to permit adjustment of the passenger back seat section independent of the driver's back seat section, while a dual control is provided for the driver, permitting the driver to control the tilted position of each of the back sections. By employing the parallelogram relationship between the sets of links 89, 125 and 57, 71, a complete control is maintained to the back sections so that the adjusted position is maintained even though the height of the seat is changed.

The seat 146 referred to hereinabove and as illustrated in Fig. 4 comprises a seat cushion 147 having a passenger back cushion 148 and a driver back cushion 149 pivoted to the device which supports the seat cushion.

What is claimed is:

1. A seat supporting device having a pair of spaced mechanisms, each said mechanism having a base element and a seat supporting element interconnected by means for shifting said seat supporting element forwardly and rearwardly and upwardly and downwardly, drive means for simultaneously moving both seat supporting elements of the two mechanisms forwardly and rearwardly, upwardly and downwardly, a pivoted back on said seat supporting elements which is movable therewith, and means connecting said drive means to said back and actuated thereby for tilting said back to a selected position relative to said seat supporting elements, which position is retained during the vertical and horizontal shifting of said seat supporting elements.

2. A seat supporting device having a pair of spaced mechanisms, each said mechanism having a base element and a seat supporting element interconnected by means for shifting said seat supporting element forwardly and rearwardly and upwardly and downwardly, drive means for simultaneously moving both seat supporting elements of the two mechanisms forwardly and rearwardly, upwardly and downwardly, a pivoted back on said seat supporting elements which is movable therewith, drive means connected to said back for tilting said back to a selected position relative to said seat supporting elements, which position is retained during the vertical and horizontal shifting of said seat supporting elements, said first drive means embodying a lead screw on one mechanism, a motor for operating said lead screw, and a solenoid operated nut mechanism on said lead screw for shifting said seat supporting elements forwardly and rearwardly.

3. A seat supporting device having a pair of spaced mechanisms, each said mechanism having a base element and a seat supporting element interconnected by means for shifting said seat supporting element forwardly and rearwardly and upwardly and downwardly, drive means for simultaneously moving both seat supporting elements of the two mechanisms forwardly and rearwardly, upwardly and downwardly, a pivoted back on said seat supporting elements which is movable therewith, means interconnecting said drive means to said back for tilting said back to a selected position relative to said seat supporting elements, which position is retained during the vertical and horizontal shifting of said seat supporting elements, said drive means embodying a lead screw on one mechanism, a motor for operating said drive means, a solenoid operated nut mechanism on said lead screw for shifting said seat supporting elements forwardly and rearwardly, and a solenoid operated nut mechanism on said lead screw for raising and lowering said seat supporting elements.

4. A seat supporting device having a pair of spaced mechanisms, each said mechanism having a base element and a seat supporting element interconnected by means for shifting said seat supporting element forwardly and rearwardly and upwardly and downwardly, drive means for simultaneously moving both seat supporting elements of the two mechanisms forwardly and rearwardly, upwardly and downwardly, a pivoted back on said seat supporting elements which is movable therewith, means interconnecting said drive means to said back for tilting said back to a selected position relative to said seat supporting elements, which position is retained during the vertical and horizontal shifting of said seat supporting elements, said drive means embodying a lead screw on one mechanism, a motor for operating said drive means, a solenoid operated nut mechanism on said lead screw for shifting said seat supporting elements forwardly and rearwardly, a solenoid operated nut mechanism on said lead screw for raising and lowering said seat supporting elements, and a solenoid operated nut mechanism on said lead screw for tilting said back to a desired position.

5. A seat supporting device having a pair of spaced mechanisms, each said mechanism having a base element and a seat supporting element interconnected by means for shifting said seat supporting element forwardly and rearwardly and upwardly and downwardly, drive means for simultaneously moving both seat supporting elements of the two mechanisms forwardly and rearwardly, upwardly and downwardly, a pivoted back on said seat supporting elements which is movable therewith, means interconnecting said drive means to said back for tilting said back to a selected position relative to said seat supporting elements, which position is retained during the vertical and horizontal shifting of said seat supporting elements, said drive means embodying a lead screw on one mechanism, a motor for operating said drive means, a solenoid operated nut mechanism on said lead screw for shifting said seat supporting elements forwardly and rearwardly, a solenoid operated nut mechanism on said lead screw for raising and lowering said seat supporting elements, a solenoid operated nut mechanism on said lead screw for tilting said back to a desired position, and means interrelating the vertical movement of said seat supporting elements and the tiltable movement of said back to maintain the tilted position of the back at said selected position independent of the vertical adjusted positions of said seat.

6. A seat supporting device having a pair of spaced mechanisms, each said mechanism having a base element and a seat supporting element interconnected by means for shifting said seat supporting element forwardly and rearwardly and upwardly and downwardly, drive means for simultaneously moving both seat supporting elements of the two mechanisms forwardly and rearwardly, upwardly and downwardly, a pivoted back on said seat supporting elements which is movable therewith, said back being made in two sections, one for the driver and one for the passenger, means connecting said drive means to at least one of said back sections for tilting said one back section to a selected position relative to said seat supporting elements, which position is retained during the vertical and horizontal shifting of said seat supporting elements, said drive means embodying a lead screw on one mechanism, a motor for operating said drive means, a solenoid operated nut mechanism on said lead screw for shifting said seat supporting elements forwardly and rearwardly, a solenoid operated nut mechanism on said lead screw for raising and lowering said seat supporting elements, a solenoid operated nut mechanism on said lead screw for tilting said driver back to a desired position, means interrelating the vertical movement of said seat supporting elements and the tiltable movement of said driver back to maintain the tilted position of the back at said selected position independent of the vertical adjusted positions of said seat, an additional solenoid nut mechanism on the lead screw for tilting the passenger section of said back, and control means accessible to a passenger which permits the passenger to tilt the passenger section of the back to a desired position.

7. A seat supporting device having a pair of spaced mechanisms, each said mechanism having a base element and a seat supporting element interconnected by means for shifting said seat supporting element forwardly and rearwardly and upwardly and downwardly, drive means for simultaneously moving both seat supporting elements of the two mechanisms forwardly and rearwardly, upwardly and downwardly, a pivoted back on said seat supporting elements which is movable therewith, said back being made in two sections, one for the driver and one for the passenger, means connecting said drive means to at least one of said back sections for tilting said one back section to a selected position relative to said seat supporting elements, which position is retained during the vertical and horizontal shifting of said seat supporting elements, said drive means embodying a lead screw on one mechanism, a motor for operating said drive means, a solenoid operated nut mechanism on said lead screw for shifting said seat supporting elements forwardly and rearwardly, a solenoid operated nut mechanism on said lead screw for raising and lowering said seat supporting elements, a solenoid operated nut mechanism on said lead screw for tilting said driver back to a desired position, means interrelating the vertical movement of said seat supporting elements and the tiltable movement of said driver back to maintain the tilted position of the back at said selected position independent of the vertical adjusted positions of said seat, an additional solenoid nut mechanism on the lead screw for tilting the passenger section of said back, control means accessible to a passenger which permits the passenger to tilt the passenger section of the back to a desired position, and control means accessible to the driver which permits the driver to tilt each back section simultaneously or independently to desired angular positions.

8. In a seat supporting device, a pair of spaced mechanisms, each mechanism having a base support, a forwardly and rearwardly movable slide on said support, a vertically shiftable seat supporting element on said slide, a back rest pivoted to said seat supporting elements, a pair of bell cranks interconnecting the slides and the seat supporting elements adjacent to the ends thereof, a lead screw carried by one of said mechanisms, motor means for driving said lead screw, driving means connected to said lead screw, said driving means including a plurality of solenoid operated nuts, one of said nuts when secured against rotation shifting said shiftable element forwardly and rearwardly, a second nut when secured against rotation shifting said seat supporting element upwardly or downwardly, and a third nut for tilting said back rest to a desired position when the nut is secured against rotation.

9. In a seat supporting device, a pair of spaced mechanisms, each mechanism having a base support, a forwardly and rearwardly movable slide on said support, a vertically shiftable seat supporting element on said blade, a back rest pivoted to said seat supporting elements, a pair of bell cranks interconnecting the slides and the seat supporting elements adjacent to the ends thereof, a lead screw carried by one of said mechanisms, motor means for driving said lead screw, driving means connected to said lead screw, said driving means including a plurality of solenoid operated nuts, one of said nuts when secured against rotation shifting said shiftable element forwardly and rearwardly, a second nut when secured against rotation shifting said seat supporting element upwardly or downwardly, a third nut for tilting said back rest to a desired position when the nut is secured against rotation, and means for maintaining said back rest in the same tilted position when the seat supporting elements are vertically adjusted to different heights.

10. In a seat supporting device, a pair of spaced mechanisms, each mechanism having a base support, a forwardly and rearwardly movable slide on said support, a vertically shiftable seat supporting element on said slide, a pair of bell cranks interconnecting the slides and the seat supporting elements adjacent to the ends thereof, a lead screw carried by one of said mechanisms, motor means for driving said lead screw, driving means connected to said lead screw, said driving means including a plurality of solenoid operated nuts, one of said nuts when secured against rotation shifting said shiftable element forwardly and rearwardly, a second nut when secured against rotation shifting said seat supporting element upwardly or downwardly, a divided back rest providing a driver's section and a passenger's section pivoted to said seat supporting elements, a third nut for tilting the driver's section of said back rest to a desired position when the nut is secured against rotation, a fourth nut tilting the passenger section of said back rest to a desired position when the nut is secured against rotation, and means for maintaining said back rest sections in the same tilted position when the seat supporting elements are vertically adjusted to different heights.

11. In a seat supporting device, a pair of spaced mechanisms, each mechanism having a base support, a forwardly and rearwardly movable slide on said support, a vertically shiftable seat supporting element on said slide, a pair of bell cranks interconnecting the slides and the seat supporting elements adjacent to the ends thereof, a lead screw carried by one of said mechanisms, motor means for driving said lead screw, driving means connected to said lead screw, said driving means including a plurality of solenoid operated nuts, one of said nuts when secured against rotation shifting said shiftable element forwardly and rearwardly, a second nut when secured against rotation shifting said seat supporting element upwardly or downwardly, a divided back rest providing a driver's section and a passenger's section pivoted to said seat supporting elements, a third nut for tilting the driver's section of said back rest to a desired position when the nut is secured against rotation, a fourth nut tilting the passanger section of said back rest to a desired position when the nut is secured against rotation, and means for maintaining said back rest sections in the same tilted position when the seat supporting elements are vertically adjusted to different heights, and control means for securing said fourth nut against rotation located adjacent to the passenger section which permits the passenger to independently adjust the passenger's section of the back rest to a desired angle.

12. In a seat supporting device, a pair of spaced mechanisms, each mechanism having a base support, a forwardly and rearwardly movable slide on said support, a vertically shiftable seat supporting element on said slide, a pair of bell cranks interconnecting the slides and the seat supporting elements adjacent to the ends thereof, a lead screw carried by one of said mechanisms, motor means for driving said lead screw, driving means connected to said lead screw, said driving means including a plurality of solenoid operated nuts, one of said nuts when secured against rotation shifting said shiftable element forwardly and rearwardly, a second nut when secured against rotation shifting said seat supporting element upwardly or downwardly, a divided back rest providing a driver's section and a passenger's section pivoted to said seat supporting elements, a third nut for tilting the driver's section of said back rest to a desired position when the nut is secured against rotation, a fourth nut tilting the passenger section of said back rest to a desired position when the nut is secured against rotation, means for maintaining said back rest sections in the same tilted position when the seat supporting elements are vertically adjusted to different heights, control means for securing said fourth nut against rotation located adjacent to the passenger seat which permits the passenger to independently adjust the passenger's section of the back rest to a desired angle, and control means adjacent to the driver permitting the driver to adjust both the passenger and the driver's section of the back rest to a desired angle simultaneously and independently of each other.

13. In a seat supporting device, a pair of spaced mechanisms, each mechanism having a base support, a forwardly and rearwardly movable slide on said support, a vertically shiftable seat supporting element on said slide, a pair of bell cranks interconnecting the slides and the seat supporting elements adjacent to the ends thereof, a lead screw carried by one of said mechanisms, motor means for driving said lead screw, driving means connected to said lead screw, said driving means including a plurality of solenoid operated nuts, one of said nuts when secured against rotation shifting said shiftable element forwardly and rearwardly, a second nut when secured against rotation shifting said seat supporting element upwardly or downwardly, a divided back rest providing a driver's section and a passenger's section pivoted to said seat supporting elements, a third nut for tilting the driver's section of said back rest to a desired position when the nut is secured against rotation, a fourth nut tilting the passenger section of said back rest to a desired position when the nut is secured against rotation, means for maintaining said back rest sections in the same tilted position when the seat supporting elements are vertically adjusted to different heights, control means for securing said fourth nut against rotation located adjacent to the passenger seat which permits the passenger to independently adjust the passenger's section of the back rest to a desired angle, and control means adjacent to the driver permitting the driver to adjust both the passenger and the driver's section of the back rest to a desired angle simultaneously and independently of each other, said driving means further including three torsion bars interconnecting the two mechanisms, two of the torsion bars transferring the movements in vertical and horizontal adjustment from one mechanism to the mechanism spaced therefrom.

14. In a seat supporting device, a pair of spaced mechanisms, each mechanism having a base support, a forwardly and rearwardly movable slide on said support, a vertically shiftable seat supporting element on said slide, a pair of bell cranks interconnecting the slides and the seat supporting elements adjacent to the ends thereof, a lead screw carried by one of said mechanisms, motor means for driving said lead screw, driving means connected to said lead screw, said driving means including a plurality of solenoid operated nuts, one of said nuts when secured against rotation shifting said shiftable element forwardly and rearwardly, a second nut when secured against rotation shifting said seat supporting element upwardly or downwardly, a divided back rest providing a driver's section and a passenger's section pivoted to said seat supporting elements, a third nut for tilting the driver's section of said back rest to a desired position when the nut is secured against rotation, a fourth nut tilting the passenger section of said back rest to a desired position when the nut is secured against rotation, means for maintaining said back rest sections in the same tilted position when the seat supporting elements are vertically adjusted to different heights, control means for securing said fourth nut against rotation located adjacent to the passenger seat which permits the passenger to independently adjust the passenger's section of the back rest to a desired angle, and control means adjacent to the driver permitting the driver to adjust both the passenger and the driver's section of the back rest to a desired angle simultaneously and independently of each other, said driving means further including three torsion bars interconnecting the two mechanisms, two of the torsion bars transferring the movements in vertical and horizontal adjustment from one mechanism to the mechanism spaced therefrom, the other one of the torsion bars being actuated from the fourth nut to operate the seat adjusting mechanism occupied by the passenger.

References Cited in the file of this patent
UNITED STATES PATENTS

| | | |
|---|---|---|
| 2,630,887 | Paquin | Mar. 10, 1953 |
| 2,655,981 | Whittingham et al. | Oct. 20, 1953 |
| 2,765,024 | Brundage | Oct. 2, 1956 |
| 2,783,826 | Hultenberger | Mar. 5, 1957 |
| 2,791,263 | Chayne | May 7, 1957 |
| 2,809,688 | Brundage | Oct. 15, 1957 |

FOREIGN PATENTS

| | | |
|---|---|---|
| 569,532 | Great Britain | May 29, 1945 |
| 1,123,195 | France | June 4, 1956 |

UNITED STATES PATENT OFFICE

CERTIFICATE OF CORRECTION

Patent No. 2,915,111                                               December 1, 1959

Robert I. Homier

It is hereby certified that error appears in the printed specification of the above numbered patent requiring correction and that the said Letters Patent should read as corrected below.

Column 3, line 51, for "he" read -- the --; column 7, line 56, for "blade" read -- slide --; column 8, line 6, for "plurailty" read -- plurality --.

Signed and sealed this 9th day of August 1960.

(SEAL)
Attest:

KARL H. AXLINE
Attesting Officer

ROBERT C. WATSON
Commissioner of Patents